(12) United States Patent
Duvinage et al.

(10) Patent No.: US 7,550,125 B2
(45) Date of Patent: Jun. 23, 2009

(54) EXHAUST GAS PURIFICATION SYSTEM

(75) Inventors: Frank Duvinage, Kirchheim (DE); Christian Goerigk, Korb (DE); Arno Nolte, Stuttgart (DE); Markus Paule, Korb (DE); Henning Sander, Ludwigsburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/106,604

(22) Filed: Apr. 21, 2008

(65) Prior Publication Data

US 2008/0256932 A1    Oct. 23, 2008

Related U.S. Application Data

(62) Division of application No. 11/837,828, filed on Aug. 13, 2007, now Pat. No. 7,361,320, and a division of application No. 10/480,167, filed as application No. PCT/EP02/04040 on Apr. 11, 2002, now Pat. No. 7,254,939.

(30) Foreign Application Priority Data

Jun. 12, 2001   (DE) ................. 101 28 414

(51) Int. Cl.
   B01D 53/56   (2006.01)
   B01D 53/94   (2006.01)
   F01N 3/10    (2006.01)

(52) U.S. Cl. ............... 423/213.2; 423/239.1; 60/274; 60/282; 60/299; 60/301

(58) Field of Classification Search ........... 423/213.2, 423/239.1; 60/274, 282, 299, 301
   See application file for complete search history.

(56) References Cited

U.S. PATENT DOCUMENTS

| | | | |
|---|---|---|---|
| 5,412,946 A | 5/1995 | Oshima et al. | |
| 5,543,124 A | 8/1996 | Yokota et al. | |
| 6,182,443 B1 | 2/2001 | Jarvis et al. | |
| 6,293,096 B1 | 9/2001 | Khair et al. | |
| 6,662,552 B1 | 12/2003 | Gunther et al. | |

(Continued)

FOREIGN PATENT DOCUMENTS

DE    34 12 289 A    10/1985

(Continued)

OTHER PUBLICATIONS

European International Search Report with English translation of relevant portion, dated Oct. 18, 2005.

(Continued)

*Primary Examiner*—Timothy C Vanoy
(74) *Attorney, Agent, or Firm*—Crowell & Moring LLP

(57) ABSTRACT

An exhaust-gas purification unit for purifying the exhaust gas from an internal combustion engine which is preferably operated in lean-burn mode, in particular a diesel engine used in motor vehicles, has a particulate filter and a SCR catalytic converter arranged in the exhaust pipe in succession in the direction of flow, and a reducing-agent supply. Ammonia can be added to the exhaust gas from the internal combustion engine on the entry side of the SCR catalytic converter by the reducing-agent supply. The exhaust-gas purification unit includes a hydrogen-generating unit for enriching the exhaust gas from the internal combustion engine with the hydrogen which it generates.

8 Claims, 4 Drawing Sheets

U.S. PATENT DOCUMENTS

| | | |
|---|---|---|
| 6,696,031 B1 | 2/2004 | Twigg et al. |
| 6,863,874 B1 | 3/2005 | Twigg |
| 6,877,313 B1 | 4/2005 | Phillips et al. |
| 2004/0018132 A1* | 1/2004 | Bartley et al. ............ 423/239.1 |
| 2005/0255992 A1 | 11/2005 | Strehlau et al. |
| 2007/0033928 A1 | 2/2007 | Hu et al. |
| 2007/0144150 A1* | 6/2007 | Breuer et al. ................. 60/286 |
| 2007/0217985 A1* | 9/2007 | Beran et al. ............... 423/239.1 |
| 2008/0022662 A1* | 1/2008 | Yan ............................ 60/286 |
| 2008/0053073 A1* | 3/2008 | Kalyanaraman et al. ...... 60/286 |

FOREIGN PATENT DOCUMENTS

| | | |
|---|---|---|
| DE | 40 32 085 A1 | 4/1993 |
| DE | 195 10 804 A1 | 9/1996 |
| DE | 198 20 828 A1 | 11/1999 |
| DE | 199 09 933 A1 | 9/2000 |
| DE | 199 22 961 A1 | 11/2000 |
| DE | 199 39 807 A1 | 3/2001 |
| DE | 100 18 792 C1 | 9/2001 |
| EP | 0 537 968 A1 | 4/1993 |
| EP | 0 783 918 A1 | 7/1997 |
| EP | 1 023 935 A1 | 8/2000 |
| JP | 2000-303826 | 10/2000 |
| WO | WO97/17532 A1 | 5/1997 |
| WO | WO 99/39809 A1 | 8/1999 |
| WO | WO 00/71868 A1 | 11/2000 |
| WO | WO 02/094419 A1 | 11/2002 |

OTHER PUBLICATIONS

Japanese Patent Abstracts (Abstract of JP 54-131,569 A) dated Dec. 1979.

Notification of Reasons of Refusal dated May 9, 2007 (three (3) pages).

* cited by examiner

EXHAUST GAS PURIFICATION SYSTEM

CROSS REFERENCE TO RELATED APPLICATIONS

This application is a divisional of U.S. application Ser. No. 11/837,828, filed Aug. 13, 2007, now U.S. Pat. No. 7,361,320, issued Apr. 22, 2008 and a divisional of U.S. application Ser. No. 10/480,167, filed Jul. 21, 2004, now U.S. Pat. No. 7,254,939 issued on Aug. 14, 2007, and a PCT International Application No. PCT/EP02/04040, filed Apr. 11, 2002, which claims priority under 35 U.S.C. § 119 to German Patent Application No. 101 28 414.4 filed Jun. 12, 2001, the entire disclosures of which are herein expressly incorporated by reference.

BACKGROUND AND SUMMARY OF THE INVENTION

The present invention relates to an exhaust gas purification unit for purifying the exhaust gas from an internal combustion engine which is preferably operated in lean burn mode.

A known exhaust gas purification unit is described in DE 40 32 085 A1. The corresponding exhaust gas purification installation includes an arrangement of denox or SCR (SCR=selective catalytic reduction) catalytic converters. These SCR catalytic converters catalyze a selective reduction reaction, in which nitrogen oxides are reduced under oxidizing conditions to form harmless nitrogen with the aid of ammonia which is introduced into the exhaust pipe or a reducing agent which releases ammonia. Ammonia is used as reducing agent, and additionally the upstream connection of a particulate filter for removing condensed exhaust gas constituents is proposed. These and similar installations remove the nitrogen oxide gaseous pollutants from oxygen containing exhaust gases, with the catalytic activity typically being effective in a temperature range between 200° C. and 450° C.

As statutory exhaust gas limit values are reduced further, effective lowering of the levels of other harmful exhaust gas constituents, such as for example carbon monoxide, hydrocarbons, has to be achieved in addition to the reduction in the levels of nitrogen oxides, in particular at relatively low exhaust gas temperatures.

An object of the present invention is to provide an exhaust gas purification unit which effectively removes pollutants within a wide temperature range.

This object has been achieved by an exhaust gas purification unit distinguished by a hydrogen generating unit. The hydrogen which is generated by this hydrogen generating unit is added to the exhaust gas unit on demand. What is known as a SCR catalytic converter is arranged in the exhaust gas purification unit downstream of a particulate filter. SCR catalytic converters often have a catalytic coating which is based on vanadium pentoxide and is almost exclusively matched to the selective reduction in the levels of nitrogen oxides under oxidizing conditions. However, SCR catalytic converters with a catalytic coating which contains precious metal(s) are also customary. Other reactions, such as for example oxidation reactions, are also catalyzed by SCR catalytic converters of this type. It is preferable for a corresponding SCR catalytic converter to be used in the exhaust gas purification unit according to the invention.

The oxidation of hydrogen is catalyzed particularly easily, i.e., even at relatively low temperatures. In this case, the oxidizing agents used may also be nitrogen oxides, which for their part are reduced to form nitrogen during the oxidation of the hydrogen. Therefore, the addition of hydrogen to the oxidizing exhaust gas leads to an effective reduction in the level of nitrogen oxides even at relatively low exhaust gas temperatures. At higher exhaust gas temperatures, the levels of nitrogen oxides can be reduced by selective reduction using the reducing agent ammonia at the SCR catalytic converter. It is thereby advantageously possible to reduce the levels of nitrogen oxides over a wide temperature range.

A further advantage of adding the gas which is generated by the hydrogen generating unit to the exhaust gas results from the more rapid heating of the corresponding catalytic converter or of the exhaust gas which is thereby achieved as a result of the exothermic oxidization of hydrogen, which is particularly easy to catalyze. This makes it possible, for example, to achieve accelerated heating of the SCR catalytic converter with regard to its SCR function.

Any desired device with which the person skilled in the art will be familiar may be used as the hydrogen generating unit. By way of example, a water electrolyzer or a methanol reformer may be suitable for applications in motor vehicles. The use of a separate hydrogen generating unit results in increased flexibility compared to methods in which a hydrogen containing gas is generated in the combustion chambers of the internal combustion engine by combustion technology measures. The increased flexibility consists firstly in the fact that the hydrogen containing gas can be used at times which are independent of engine operation, and secondly that if necessary it can be deliberately added to the exhaust pipe at different locations. The flexibility of the system can be increased still further if a temporary store is connected downstream of the hydrogen generating unit. The hydrogen containing gas mixture which is temporarily stored in this store can then be added to the exhaust gas in relatively large quantities at times when there is a high demand. The hydrogen generating unit can therefore also be made smaller than if a temporary store is not used.

In a currently preferred embodiment, the hydrogen generating unit is configured as a reformer, with the fuel which is in any case carried around for operation of the internal combustion engine being used. The reforming process in the reformer can be assisted in both purely thermal terms and catalytically by sub stoichiometric addition of air. The hydrogen content of the gas which is typically formed can be further increased by connecting a catalytic shift process downstream. In these shift processes which are known per se, carbon monoxide is reacted with steam to form carbon dioxide and hydrogen, with the result that the carbon monoxide content of the starting gas is correspondingly lowered and the hydrogen content is correspondingly increased.

In one configuration of the invention, the reducing agent supply has an ammonia generating unit for generating the ammonia which can be added to the exhaust gas from the internal combustion engine. This in particular avoids the need to carry around ammonia in gas or liquid form, which presents problems for motor vehicles. DE 199 09 933 A1 and DE 199 22 961, for example, have disclosed methods in which ammonia is provided by reduction of nitrogen oxide generated inside or outside the combustion source. Since this reduction takes place under reducing conditions in a catalytic converter integrated into the exhaust pipe, the internal combustion engine has to be operated under rich conditions at least from time to time, which presents difficulties in particular in the case of diesel engines.

By contrast, in a particularly advantageous configuration of the invention, the ammonia generating unit is configured as a nitrogen converting ammonia generating unit. In this context, the term nitrogen converting is to be understood as meaning that the ammonia generating unit uses elemental nitrogen to generate ammonia. The nitrogen which is used to generate ammonia can easily be removed from the ambient air or from the exhaust gas from the internal combustion engine. Therefore, the generation of ammonia is, on one hand, advantageously independent of the nitrogen oxides generated by the internal combustion engine or substantially independent of the internal combustion engine operating mode, and, on the other hand, the need for ammonia or ammonia releasing materials to be carried around onboard the motor vehicle is obviated.

In the exhaust gas purification unit according to the invention with nitrogen converting ammonia generating unit, this unit is, on one hand, supplied with the hydrogen containing gas from the hydrogen generating it and, on the other hand, with air or with an exhaust gas part stream removed from any desired location in the exhaust pipe. For this purpose, by way of example, in a first synthesis step nitrogen oxide is generated from the atmospheric nitrogen supplied or from the nitrogen in the oxygen containing exhaust gas supplied by a process which is known per se, such as a plasma process, or by an arc. In a preferably catalytically enhanced subsequent process, the nitrogen oxide generated in the first synthesis stage is then reduced to form ammonia when the hydrogen containing gas is added.

In a further advantageous configuration of the invention, a nitrogen oxide storage catalytic converter is arranged in the exhaust pipe upstream of the particulate filter. With this configuration of the invention, exhaust gas purification is achieved over a wide temperature range in particular by utilizing the temperature drop between the nitrogen oxide storage catalytic converter, particulate filter and SCR catalytic converter, given a suitable arrangement in the exhaust pipe. Specifically, if the temperature range at which the nitrogen oxide storage catalytic converter is effective is departed from in the event of a high engine load and therefore a rising exhaust gas temperature, the nitrogen oxide removal function can be carried out by the SCR catalytic converter which is located further downstream and is therefore at a lower temperature.

In another particularly advantageous embodiment of the exhaust gas purification unit according to the invention, an oxidization catalytic converter is arranged in the exhaust pipe upstream of the particulate filter. This arrangement too is advantageously suitable, with a view to generating a hydrogen containing gas or an ammonia containing gas, to allow exhaust gas purification within a very wide temperature range.

A further configuration of the invention is characterized in that the particulate filter is catalytically coated. This firstly facilitates the oxidization of oxidizable solid or non volatile constituents which have been deposited on the particulate filter. Secondly, the particulate filter coating can simultaneously catalyze the selective reduction of nitrogen oxide with hydrogen which takes place at low exhaust gas temperatures. Since the coated particulate filter has oxidation catalyzing properties, it is additionally advantageously possible for oxidizable and harmful constituents of gaseous nature to be removed from the exhaust gas at the same time as particulates are removed.

In a still further configuration of the invention, the hydrogen containing gas generated by the hydrogen generating unit can be added to the exhaust gas from the internal combustion engine on the entry side of the SCR catalytic converter and/or on the entry side of the particulate filter or on the entry side of the nitrogen oxide storage catalytic converter.

On account of the ready oxidizability of the hydrogen, the hydrogen containing gas is then advantageously added to the oxidizing exhaust gas on the entry side of the precious metal containing nitrogen oxide storage catalytic converter or SCR catalytic converter arranged in the exhaust pipe or on the entry side of the catalytically coated particulate filter if rapid heating of the corresponding component is desired. The heating results from the release of heat from the exothermic oxidation of the hydrogen at this component.

A further advantageous use of the hydrogen containing gas lies in the selective reduction of nitrogen oxides using hydrogen which takes place in particular at low exhaust gas temperatures (approx. 80° C. to 200° C.) at a precious metal containing catalytic converter or at the catalytically coated particulate filter. At low exhaust gas temperatures, by way of example, the levels of nitrogen oxides are reduced by the addition of the hydrogen containing gas on the entry side of the nitrogen oxide storage catalytic converter. The reduction of nitrogen oxides by hydrogen takes place at the catalytic centers of the precious metal containing nitrogen oxide storage catalytic converter. The addition of the readily oxidizable hydrogen containing gas moreover heats the nitrogen oxide storage catalytic converter by the exothermic oxidation process.

When the nitrogen oxide storage catalytic converter has reached its operating temperature for the removal of nitrogen oxides in alternating lean/rich mode, the addition of the hydrogen containing gas on the entry side of the nitrogen oxide storage catalytic converter can be terminated and the internal combustion engine can be switched over from pure lean burn mode to an alternating lean/rich mode. The levels of nitrogen oxides are then reduced in a known way by alternating storage of the nitrogen oxides in the nitrogen oxide storage catalytic converter when the internal combustion engine is in lean burn mode and reduction of the stored nitrogen oxides when the internal combustion engine is in rich burn mode. Overall, therefore, the levels of nitrogen oxides can be reduced by the nitrogen oxide storage catalytic converter within a wide temperature range from approx. 80° C. to approx. 400° C.

If necessary, the hydrogen containing gas can also be added on the entry side of the SCR catalytic converter and here too can be utilized at low temperatures for the selective reduction of the levels of nitrogen oxides and for the rapid heating to operating temperature. The optional addition of the hydrogen containing gas at the abovementioned locations therefore results in an optimum exhaust gas purification function of the overall exhaust gas purification unit.

In a yet further configuration of the invention, the hydrogen containing gas generated by the hydrogen generating unit can be added to the exhaust gas from the internal combustion engine on the entry side of the SCR catalytic converter and/or on the entry side of the oxidization catalytic converter. At low exhaust gas temperatures, the addition of the readily oxidizable hydrogen containing gas on the entry side of the oxidization catalytic converter allows the latter to be rapidly heated to its operating temperature for its oxidization catalyzing action. This makes it possible to achieve effective removal of oxidizable harmful constituents (carbon monoxide, hydrocarbons) from the exhaust gas very quickly as the engine is being warmed up, for example. At the same time, effective reduction in the levels of nitrogen oxides can be achieved by the selective reduction of nitrogen oxides which takes place at low temperatures at the precious metal containing oxidization catalytic converter.

The addition of the hydrogen containing gas generated by the hydrogen generating unit on the entry side of the SCR catalytic converter also advantageously enables the SCR catalytic converter to reach its operating temperature for the SCR function quickly. In the case of a precious metal containing SCR catalytic converter, the levels of nitrogen oxides can be reduced at this catalytic converter with the aid of the added hydrogen, preferably at low temperatures.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
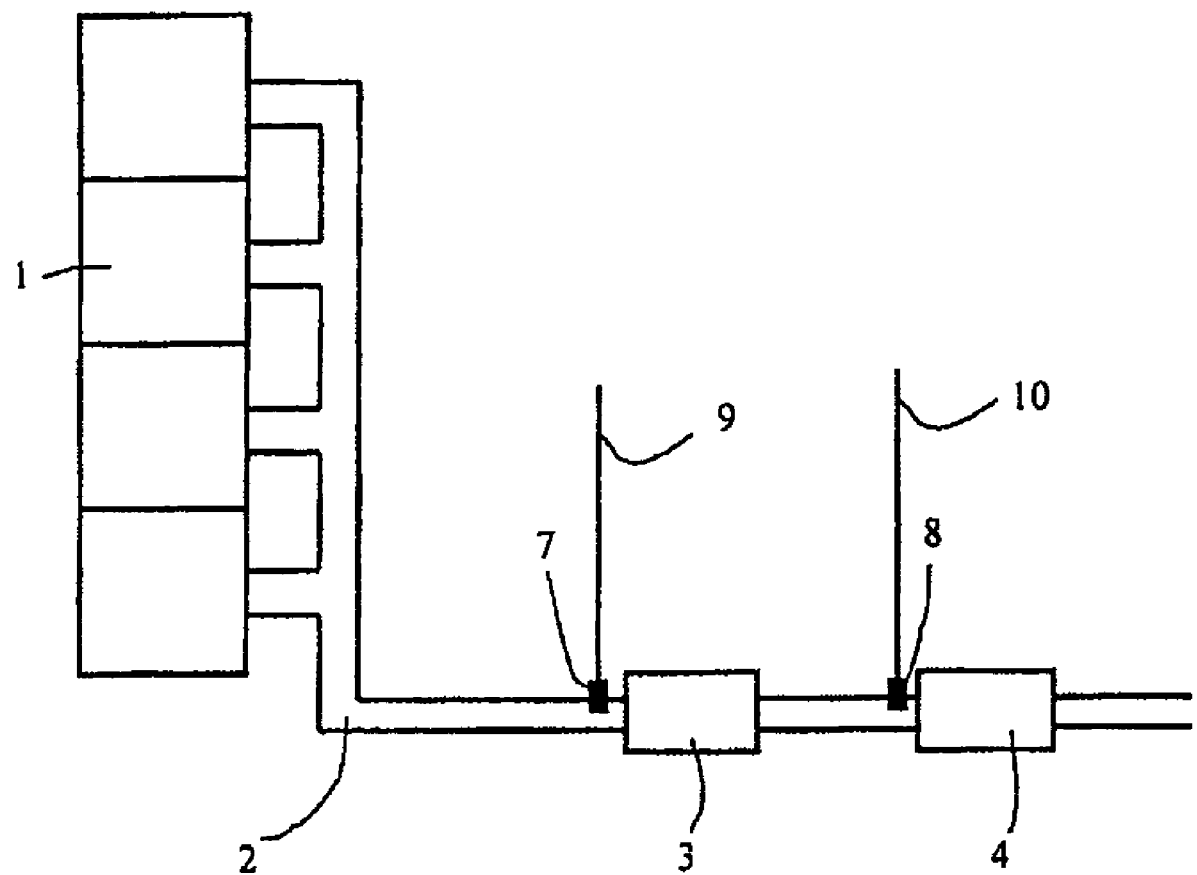
FIG. 1 is a schematic block diagram of an internal combustion engine with associated exhaust gas purification unit with particulate filter and SCR catalytic converter in the exhaust pipe and addition points for hydrogen containing gas and ammonia containing gas.

In accordance with FIG. 1, the exhaust gas which is emitted by the internal combustion engine 1, which is, by way of example, of four cylinder configuration, is fed via an exhaust pipe 2 to a particulate filter 3 and then an SCR catalytic converter 4. The SCR catalytic converter preferably contains precious metals. SCR catalytic converters of this type are typically provided with a zeolite coating which contains precious metals from the platinum group.

Furthermore, addition lines 9, 10 supply the gases provided by the hydrogen generating unit and ammonia generating unit, respectively, (not shown here), and can be added to the exhaust pipe 2 via the addition points 7, 8. The gas generated by the hydrogen generating unit can be added to the exhaust gas via both addition lines 9, 10 or via both addition points 7, 8. The gas generated by the ammonia generating unit is added to the exhaust gas only via the addition line 10 or via the addition point 8.

Components for controlling the internal combustion engine 1 and the overall exhaust gas purification unit which are not relevant to an understanding of the invention, such as, for example, an electronic control unit for controlling the operation of the hydrogen generating unit and/or the ammonia generating unit, or for controlling the addition of gas, etc., and also temperature sensors and lambda sensors in the exhaust pipe and the like are not shown for the sake of clarity.

In a currently preferred embodiment, the particulate filter 3 is provided with a coating which has the effect of catalyzing oxidization and typically contains precious metals from the platinum group. In this case, at least from time to time hydrogen containing gas is added to the exhaust gas at low exhaust gas temperatures (approx. 80° C. to approx. 200° C. on the entry side of the particulate filter 3) by the hydrogen generating unit or by the temporary store connected downstream of it, via the addition line 9 and the addition point 7.

The exothermic oxidization of the readily oxidizable hydrogen containing gas which then takes place in the particulate filter 3 heats the latter, so that it rapidly reaches its operating temperature for oxidization of further oxidizable exhaust gas constituents, such as for example hydrocarbons. At the same time, at these temperatures selective reduction of nitrogen oxides contained in the exhaust gas from the internal combustion engine 1 by way of the added reducing agent hydrogen takes place in the particulate filter 3. However, this reaction is typically limited to a relatively narrow temperature range. If, with increasing heating of the particulate filter 3, on one hand, the operating temperature of the latter for oxidization of hydrocarbons is reached and, on the other hand, the optimum temperature range with a view to reducing the levels of nitrogen oxides has already been exceeded, the addition of the hydrogen containing gas via the addition point 7 is terminated.

If, at this time, the SCR catalytic converter 4 arranged downstream of the particulate filter 3 in the exhaust pipe 2 has not yet reached its operating temperature for selectively reducing the levels of nitrogen oxides using ammonia, hydrogen containing gas is added at least from time to time via the addition line 10 and the addition point 8. This results in accelerated heating of the SCR catalytic converter. In addition, the selective reduction in the levels of nitrogen oxide using the reducing agent hydrogen then takes place at this catalytic converter. Given a correspondingly increased temperature of the SCR catalytic converter 4, addition of the hydrogen containing gas can be terminated and ammonia from the ammonia generating unit can be added to the exhaust gas via the addition line 10 and the addition point 8 in order to maintain the function of reducing the levels of nitrogen oxides.

The appropriate amount of the corresponding reducing agent to be added and the choice of addition location are advantageously determined in the electronic control unit which is in any case present in modern internal combustion engines. In doing so, it is preferable, as described above, for the temperature of the exhaust gas to be used as a criterion. Addition of the reducing agent which is controlled by a characteristic diagram based on the prevailing operating point of the internal combustion engine is also possible.

Figure 2:
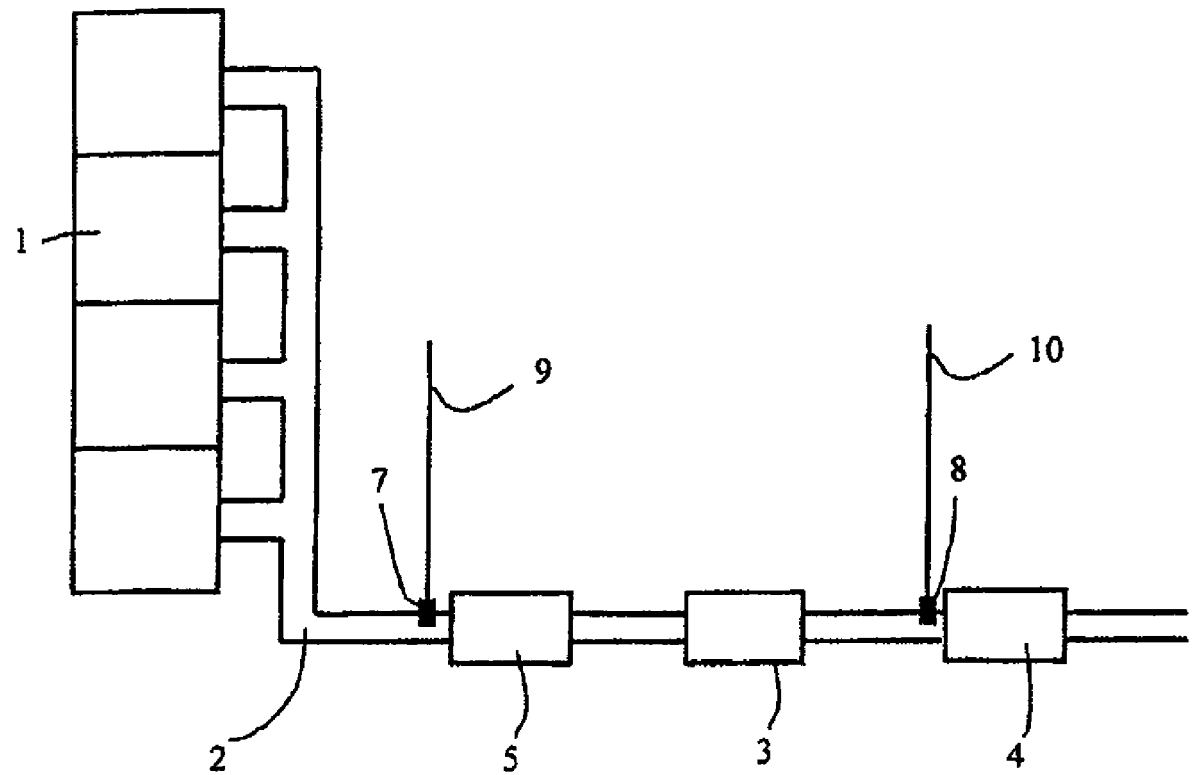
FIG. 2 is a schematic block diagram of an internal combustion engine with associated exhaust gas purification unit as shown in FIG. 1, but with a nitrogen oxide storage catalytic converter arranged upstream of the particulate filter in the exhaust pipe.

FIG. 2 shows a further example of the exhaust gas purification unit according to the invention. In this context, features which correspond to those shown in FIG. 1 are provided with identical reference numerals. As an additional feature to the embodiment illustrated in FIG. 1, a nitrogen oxide storage catalytic converter 5 is arranged in the exhaust pipe 2 upstream of the catalytically-coated particulate filter 3. The addition point 7 of the hydrogen containing gas is in this case provided on the entry side of this catalytic converter 5.

Since the nitrogen oxide storage catalytic converter 5 typically also contains precious metals from the platinum group, this catalytic converter 5 also has the property of being able to reduce nitrogen oxides at low exhaust gas temperatures with the aid of the reducing agent hydrogen. Primarily, i.e. at temperatures of the nitrogen oxide storage catalytic converter 5 from approx. 200° C. to approx. 450° C., however, the levels of nitrogen oxides in the exhaust gas from the internal combustion engine 1 are reduced in a known way by an alternating lean/rich operating mode. If the temperature is below the range mentioned above, the hydrogen containing gas is added to the exhaust gas on the entry side of the nitrogen oxide storage catalytic converter 5. This results in accelerated heating of the nitrogen oxide storage catalytic converter.

When the temperature of the catalytic converter 5 has risen, the addition of the hydrogen containing gas via the addition point 7 is terminated and the internal combustion engine 1 is switched over from pure lean burn mode to the alternating lean/rich operating mode. Consequently, on one hand, the function of reducing the levels of nitrogen oxides is retained, while, on the other hand, oxidizable gaseous pollutants, such as carbon monoxide and hydrocarbons, are oxidized and rendered harmless in the nitrogen oxide storage catalytic converter 5 during the lean burn phases of the alternating lean/rich operating mode of the internal combustion engine 1.

As a supporting measure, ammonia from the ammonia generating unit can be added to the exhaust gas via the addition line 10 and the addition point 8 on the entry side of the SCR catalytic converter 4 during the lean burn phases of the alternating lean/rich operating mode. This makes it possible, for example, for nitrogen oxide which passes through the nitrogen oxide storage catalytic converter 5 as nitrogen oxide slippage to be rendered harmless in the SCR catalytic converter 4. Consequently, the internal combustion engine 1 can be operated for a considerably longer time in the economical lean burn mode. If the temperature of the SCR catalytic converter 4 required for optimum reduction in the levels of nitrogen oxides using ammonia has not yet been reached, in this case too rapid heating of the SCR catalytic converter 4 can be achieved by the addition of hydrogen containing gas from the hydrogen generating unit from time to time.

A further advantage of the configuration shown in FIG. 2 is that in the event of the temperature range at which the nitrogen oxide storage catalytic converter is effective has been exceeded, at approx. 450° C., the SCR catalytic converter 4 arranged further downstream in the exhaust pipe 2 is still active. On account of spatial distance between nitrogen oxide storage catalytic converter 5 and SCR catalytic converter 4, a temperature drop of approx. 100° C. is present between these catalytic converters 5, 4 at relatively high exhaust gas temperatures. Because the selective reduction in the levels of nitrogen oxides using ammonia typically takes place up to approx. 450° C. in the SCR catalytic converter 4, in the event of an exhaust gas temperature of over approx. 400° C. on the entry side of the nitrogen oxide storage catalytic converter 5, the internal combustion engine 1 is switched over from the alternating lean/rich operating mode to pure lean burn mode and the levels of nitrogen oxides are reduced by the SCR catalytic converter 4 alone. In this way, very effective reduction in the levels of the nitrogen oxides in the exhaust gas from the internal combustion engine 1 can be carried out within a very wide temperature range.

Figure 3:
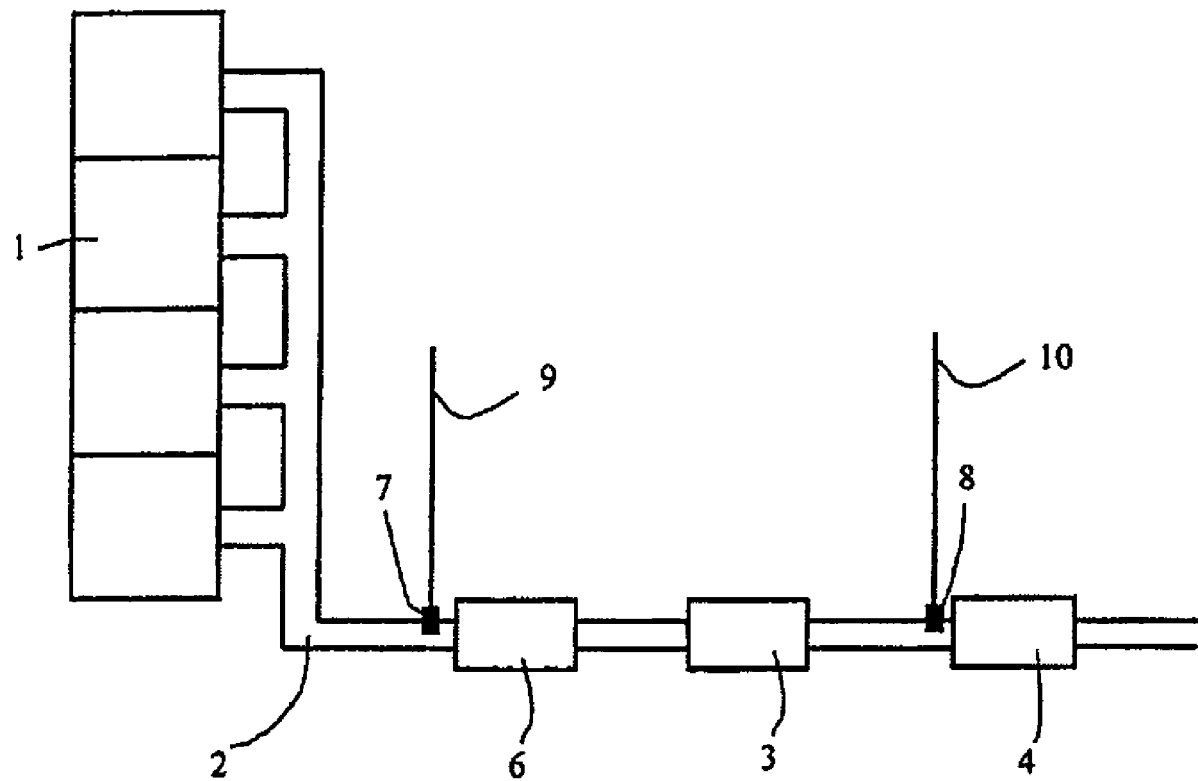
FIG. 3 is a schematic block diagram of an internal combustion engine with associated exhaust gas purification unit as illustrated in FIG. 1, but with an oxidization catalytic converter arranged upstream of the particulate filter in the exhaust pipe.

The embodiment of the exhaust gas purification unit according to the present invention shown in FIG. 3 differs from the example shown in FIG. 2 by virtue of the fact that an oxidization catalytic converter 6 is arranged in the exhaust pipe 2 upstream of the particulate filter 3. The addition point 7 for the hydrogen containing gas is in this case provided on the entry side of this catalytic converter 6. Furthermore, in this exemplary embodiment the particulate filter 3 is uncoated. Features which correspond to those shown in FIG. 1 and/or FIG. 2 are also provided with identical reference numerals. Similarly to the embodiments shown in FIG. 1 and/or FIG. 2, the hydrogen containing gas generated by the hydrogen generating unit can be added to the exhaust gas both via the addition line 9 and the addition point 7 and via the addition line 10 and the addition point 8.

At low exhaust gas temperatures from approx. 80° C. to approx. 200° C. on the entry side of the oxidization catalytic converter 6, hydrogen containing gas from the hydrogen generating unit and/or from the temporary store connected downstream of it is at least from time to time added to the exhaust gas via the addition line 9 and the addition point 7. The exothermic oxidation of the readily oxidizable hydrogen containing gas which then takes place in the oxidization catalytic converter 6 heats the latter, so that it rapidly reaches its operating temperature required for oxidation of further oxidizable exhaust gas constituents, such as for example hydrocarbons. At the same time, at these temperatures selective reduction of nitrogen oxides contained in the exhaust gas from the internal combustion engine 1 with the added reducing agent hydrogen takes place in the oxidization catalytic converter 3. If, with increasing heating of the oxidization catalytic converter 6, on one hand, the operating temperature of the latter required for oxidation of hydrocarbons has been reached and, on the other hand, the optimum temperature range with regard to reduction in the levels of nitrogen oxides has already been exceeded, the addition of the hydrogen containing gas via the addition point 7 is terminated.

If, at this time, the SCR catalytic converter 4 arranged downstream of the particulate filter 3 in the exhaust pipe 2 has not yet reached its operating temperature for selectively reducing the levels of nitrogen oxides using ammonia, hydrogen containing gas is added at least from time to time via the addition line 10 and the addition point 8. This results in accelerated heating of the SCR catalytic converter. In addition, the selective reduction of the levels of nitrogen oxide using the reducing agent hydrogen now also takes place at this catalytic converter. When the temperature of the SCR catalytic converter 4 has risen accordingly, the addition of the hydrogen containing gas can be terminated, and ammonia from the ammonia generating unit can be added to the exhaust gas via the addition line 10 and the addition point 8 in order to maintain the function of reducing the levels of nitrogen oxides.

Figure 4:
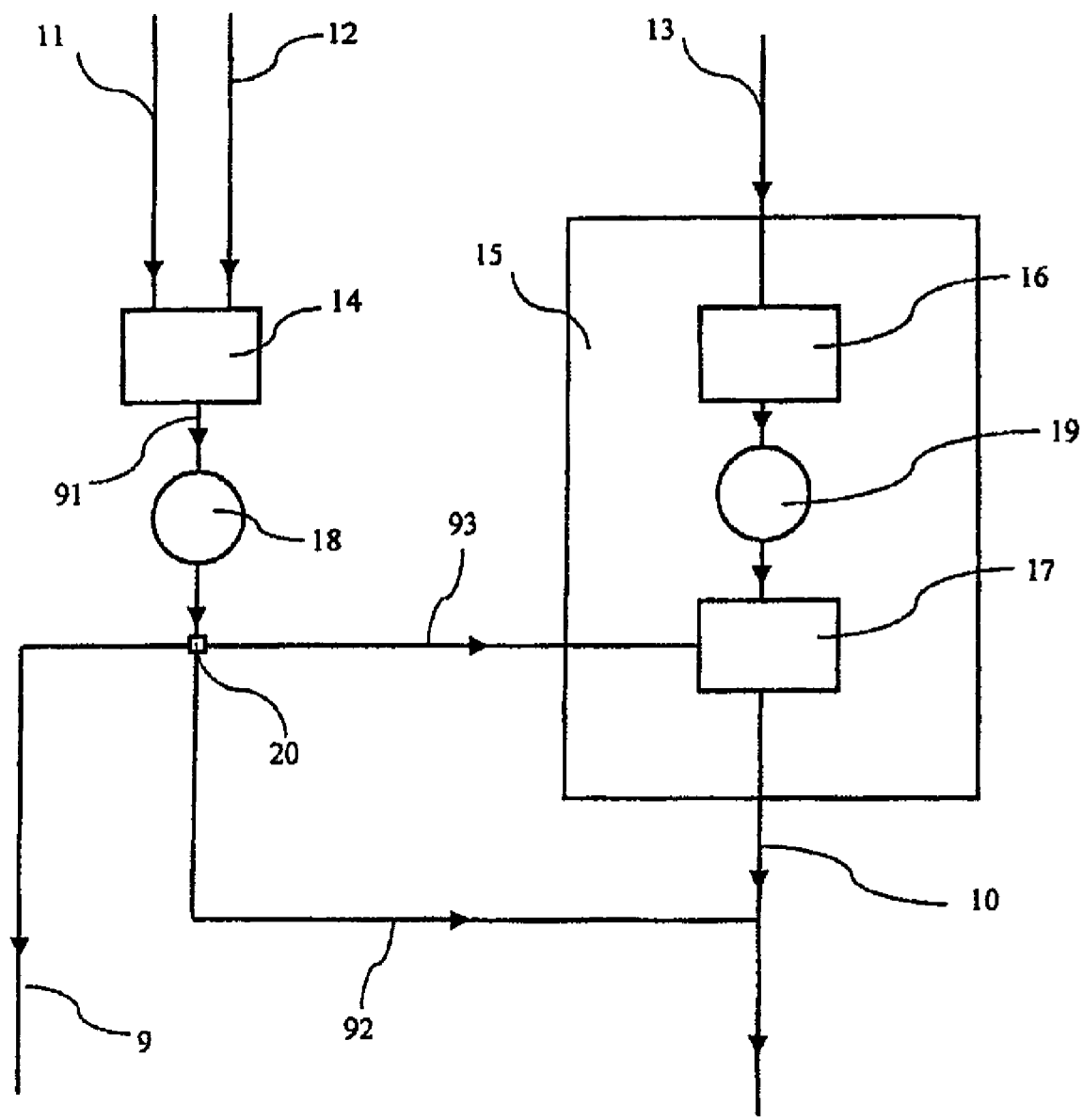
FIG. 4 is a schematic block diagram of the system arrangement of hydrogen generating unit and ammonia generating unit.

FIG. 4 shows an embodiment of the system arrangement of hydrogen generating unit 14 and ammonia generating unit 15, as well as the associated infrastructure, in the form of a schematic block diagram. This embodiment refers to the features illustrated in FIGS. 1 to 3, using identical reference numerals. Control lines and electrical power supply lines as well as components which are not pertinent to an understanding of the invention by one of ordinary skill, such as for example pumps for delivering fuel or gas, are not shown for the sake of clarity.

The hydrogen generating unit 14 is preferably configured as a catalytic reformer and is supplied with fuel and air via the fuel feed line 11 and the air feed line 12, respectively. The fuel used is preferably the fuel which is available on board the motor vehicle for operation of the internal combustion engine 1. The fuel supplied is converted into a hydrogen containing gas in a catalytic reforming process using the supplied air in the hydrogen generating unit 14 when required and is fed via the line 91 to a temporary store 18. From there, the hydrogen containing gas which has been generated can optionally be fed to the ammonia generating unit 15 via a line 93 and/or released via the line 92 or added to the exhaust gas from the internal combustion engine 1 via an addition line 9, by way of a switching point 20 in the form of a four-way valve. The line 92 opens out into the additional line 10, which for its part leads on to the exhaust pipe 2.

The ammonia generating unit 15 is used to generate ammonia containing gas when required. In the preferred embodiment illustrated here, it includes a nitrogen oxide generator 16, a temporary store 19 and a nitrogen oxide reduction unit 17. Air or a partial stream of oxygen containing exhaust gas removed from the exhaust pipe 2 of the internal combustion engine 1 is fed to the nitrogen oxide generator 16 via a feed line 13. The generation of nitrogen oxide in the nitrogen oxide generator is preferably carried out with the aid of an arc, although it is also contemplated that a plasma process, for example, can be used for this purpose. The nitrogen oxide containing gas which is generated can be temporarily stored in the downstream temporary store 19, from where it can be added to the nitrogen oxide reduction unit 17.

In the nitrogen oxide reduction unit 17, the nitrogen oxide supplied is reduced to form ammonia with the aid of the hydrogen containing gas supplied via the line 93. A catalytic process, which may be carried out continuously or discontinuously in a manner known per se, is preferably suitable for this purpose. By way of example, the continuous reaction of nitrogen oxide to form ammonia can be carried out with the aid of the reducing agent hydrogen at any catalytic converter which is suitable for this purpose. Catalytic converters which have a catalytic coating similar to that of standard three way catalytic converters are particularly suitable for this purpose.

For discontinuous generation of ammonia, the nitrogen oxide reduction unit 17 preferably includes a nitrogen oxide storage catalytic converter, downstream of which an ammonia generating catalytic converter may be connected. After a sufficient quantity of nitrogen oxide has been stored in the nitrogen oxide storage catalytic converter, the stored nitrogen oxide is released from the nitrogen oxide storage catalytic converter and reduced to form ammonia by the introduction of hydrogen containing gas from the line 93 in a known way. Ammonia which is generated in this way is then added to the exhaust gas from the internal combustion engine 1 via the addition line 10. For suitable splitting of the addition of ammonia over the course of time, it may also be advantageous for the temporary store 19 to be arranged directly at the exit side of the nitrogen oxide reduction unit 17.

The embodiment of hydrogen generating unit 14 and ammonia generating unit 15 described above, and the interaction between these units, therefore advantageously allows hydrogen-containing gas or ammonia-containing gas to be added to the exhaust gas from the internal combustion engine 1 as required via the addition lines 9, 10 and the addition points 7, 8.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

The invention claimed is:

1. An exhaust gas purification system associated with a diesel engine of a motor vehicle and comprising a nitrogen oxide storage catalytic converter arranged in an exhaust gas pipe for conveying exhaust gas generated by the diesel engine, a particulate filter arranged downstream of said nitrogen oxide storage catalytic converter in said exhaust gas pipe, an SCR catalytic converter arranged downstream of said particulate filter in said exhaust gas pipe, and a reducing agent supply, the reducing agent supply being configured for enriching the exhaust gas with hydrogen by feeding hydrogen into said exhaust gas pipe upstream of the SCR catalytic converter.

2. The exhaust gas purification system as claimed in claim 1, wherein an oxidation catalytic converter is arranged upstream of the particulate filter in said exhaust gas pipe.

3. The exhaust gas purification system as claimed in claim 1, wherein the particulate filter is catalytically coated.

4. The exhaust gas purification system as claimed in claim 1, wherein said reducing agent supply is configured for feeding hydrogen into said exhaust gas pipe upstream of the nitrogen oxide storage catalytic converter and/or upstream the particulate filter and downstream of the nitrogen oxide storage catalytic converter and/or upstream of the SCR catalytic converter and downstream of the particulate filter.

5. The exhaust gas purification system as claimed in claim 1, wherein said reducing agent supply comprises a hydrogen generating unit.

6. The exhaust gas purification system as claimed in claim 5, wherein said hydrogen generating unit is configured as a reformer for reforming fuel used to operate said diesel engine.

7. The exhaust gas purification system as claimed in claim 1, wherein said reducing agent supply comprises an ammonia generating unit for enriching the exhaust gas with ammonia upstream of the SCR catalytic converter.

8. The exhaust gas purification system as claimed in claim 7, wherein said ammonia generating unit is configured as a nitrogen converting ammonia generating unit.

* * * * *